(12) United States Patent
Ramle et al.

(10) Patent No.: US 9,986,467 B2
(45) Date of Patent: May 29, 2018

(54) NODE AND METHOD FOR A COMBINED SINGLE RADIO VOICE CALL CONTINUITY AND A PACKET SWITCHED HANDOVER

(71) Applicant: Telefonaktiebolaget L M Ericsson (publ), Stockholm (SE)

(72) Inventors: Peter Ramle, Molnlycke (SE); Ralf Keller, Wurselen (DE); Gunnar Rydnell, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 254 days.

(21) Appl. No.: 14/766,032

(22) PCT Filed: Feb. 6, 2013

(86) PCT No.: PCT/EP2013/052304
§ 371 (c)(1),
(2) Date: Aug. 5, 2015

(87) PCT Pub. No.: WO2014/121825
PCT Pub. Date: Aug. 14, 2014

(65) Prior Publication Data
US 2015/0373590 A1 Dec. 24, 2015

(51) Int. Cl.
| | | |
|---|---|---|
| H04W 36/00 | (2009.01) | |
| H04W 8/24 | (2009.01) | |
| H04W 76/02 | (2009.01) | |
| H04W 88/06 | (2009.01) | |

(52) U.S. Cl.
CPC .......... *H04W 36/0022* (2013.01); *H04W 8/24* (2013.01); *H04W 76/026* (2013.01); *H04W 88/06* (2013.01)

(58) Field of Classification Search
CPC .. H04W 36/00; H04W 36/14; H04W 36/0022
See application file for complete search history.

(56) References Cited

U.S. PATENT DOCUMENTS

| | | | | |
|---|---|---|---|---|
| 2012/0115489 A1* | 5/2012 | Shuai | ........ | H04W 36/14 455/438 |
| 2013/0188606 A1* | 7/2013 | Xie | ........ | H04W 36/0022 370/331 |

FOREIGN PATENT DOCUMENTS

WO 2011020110 A1 2/2011

OTHER PUBLICATIONS

"3rd Generation Partnership Project; Technical Specification Group Services and System Aspects; Single Radio Voice Call Continuity (SRVCC); Stage 2 (Release 11)", 3GPP TS 23.216 V11.3.0 (Dec. 2011), 59 pages.

(Continued)

*Primary Examiner* — Andrew Lai
*Assistant Examiner* — Leon Andrews
(74) *Attorney, Agent, or Firm* — Rothwell, Figg, Ernst & Manbeck, P.C.

(57) ABSTRACT

Example embodiments presented herein are directed towards a base station, user equipment and Mobility Management Entity, and corresponding methods, for providing handling during a combined Single Radio Voice Call Continuity and Packet Switched Handover procedure.

34 Claims, 9 Drawing Sheets

(56) References Cited

OTHER PUBLICATIONS

3gpp, "3GPP TS 23.272 V11.3.0 (Dec. 2012), 3rd Generation Partnership Project; Technical Specification Group Services and System Aspects; Circuit Switched (CS) fallback in Evolved Packet System (EPS); Stage 2 (Release 11)", Dec. 18, 2012, pp. 1-91, XP055095110.
Samsung, "Concurrent CS/PS mobility to1xRTT and HRPD", 3GPP Draft; R2-093977 Concurrent_CS_PS_Mobility, 3rd Generation Partnership Project (3GPP), Mobile Competence Centre; 650, Route Des Lucioles; F-06921 Sophia-Antipolis Cedex, France, No. Los Angeles, USA, Jun. 23, 2009, 6 pages, XP050352153.

* cited by examiner

NODE AND METHOD FOR A COMBINED SINGLE RADIO VOICE CALL CONTINUITY AND A PACKET SWITCHED HANDOVER

CROSS-REFERENCE TO RELATED APPLICATIONS

This application is a 35 U.S.C. § 371 National Phase Entry Application from PCT/EP2013/052304, filed Feb. 6, 2013, and designating the United States.

TECHNICAL FIELD

Example embodiments presented herein are directed towards a base station, user equipment and Mobility Management Entity, and corresponding methods, for providing handling during a combined Single Radio Voice Call Continuity and Packet Switched Handover procedure.

BACKGROUND

In a typical cellular system, also referred to as a wireless communications network, wireless terminals, also known as mobile stations and/or user equipment units communicate via a Radio Access Network (RAN) to one or more core networks. The wireless terminals can be mobile stations or user equipment units such as mobile telephones also known as "cellular" telephones, and laptops with wireless capability, e.g., mobile termination, and thus may be, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

Code division multiple access (CDMA) is a channel access method used by various radio communication technologies. CDMA employs spread-spectrum technology and a special coding scheme (where each transmitter is assigned a code) to allow multiple users to be multiplexed over the same physical channel. Mobility procedures between LTE and CDMA systems are defined by 3GPP. These procedures are to a large extent defined as tunnelling of CDMA messages from the user equipment to the CDMA system through the LTE system. These mobility procedures are, for example, SRVCC to 1×RTT CDMA, CSFB to 1×RTT, PS HO to CDMA HRPD for PS, and eCSFB (e.g., CSFB with simultaneous PS HO to CDMA).

These functions support voice applications and data applications. CSFB supports voice when IMS voice applications are not implemented in LTE, while the SRVCC implies handoff of an on-going IMS voice call from LTE to 1×RTT CDMA. The PS HO to HRPD implements the handoff of a data session from LTE to CDMA. The eCSFB is specified such that simultaneous voice fall back and data handoff can be done for data session continuity while taking a voice call.

The mobility procedures include optimized as well as non-optimized hand offs. The optimized solutions depend on signaling between EPC and CDMA Core to prepare for seamless handoff, while the non-optimized solutions depend on the user equipment re-selecting to a CDMA cell when needed. The optimized mobility solutions rely on specified interfaces between the systems. The S102 interface between the 3GPP MME and the 1×RTT MSC Server supports CSFB or SRVCC to 1×RTT, as shown in FIG. 1. Paging, CSFB or SRVCC messages are tunneled over S102. The S101 and S103 interfaces between the 3GPP MME and the HRPD (packet node) supports PS HO signaling from LTE to CDMA and S103 is a user data interface for data forwarding while doing PS HO, as shown in FIG. 2.

SUMMARY

A need exists for improved SRVCC and PS HO procedures between LTE and CDMA. Thus, according to some of the example embodiments, a decision may be made in the eNB and communicated to the user equipment to perform a simultaneous 1×RTT SRVCC and PS HO to HRPD to CDMA systems. Thus, signaling between the eNB and the user equipment is modified according to the example embodiments presented herein. Furthermore, the example embodiments presented herein provide a new behavior in the MME to support session continuity for PS sessions. To support this function, an indication from the eNB to the MME over the S1 interface may be utilized to inform the MME not suspend or deactivate bearers in case of simultaneous 1×RTT SRVCC and PS HO to HRPD.

Thus, an example object of some of the example embodiments presented herein is to provide an improved means for SRVCC and PS HO. At least one example advantage of the example embodiments is simultaneous voice continuity and data continuity during the SRVCC and PS HO.

Accordingly, some of the example embodiments are directed towards a method, in a base station, for a combined SRVCC and a PS HO from a LTE to a CDMA based communication system. The base station is comprised in the LTE based communication system. The method comprises sending, to a user equipment, a combined SRVCC and PS HO request. The method also comprises receiving, from a MME, a SRVCC related message indicating a result of a SRVCC portion of the combined SRVCC and PS HO request. The method further comprises receiving, from the MME, a PS HO related message indicating a result a PS HO portion of the combined SRVCC and PS HO request. The method further comprises managing the combined SRVCC and PS HO based on the SRVCC related message and the PS HO related message.

Some of the example embodiments are directed towards a base station for a combined SRVCC and a PS HO from a LTE to a CDMA based communication system. The base station is comprised in the LTE based communication system. The base station comprises processing circuitry configured to send, to a user equipment, a combined SRVCC and PS HO request. The processing circuitry is further configured to receive, from a MME, a SRVCC related message indicating a result of a SRVCC portion of the combined SRVCC and PS HO request. The processing circuitry is further configured to receive, from the MME, a PS HO related message indicating a result a PS HO portion of the combined SRVCC and PS HO request. The processing circuitry is also configured to manage the combined SRVCC and PS HO based on the received SRVCC related message and the received PS HO related message.

Some of the example embodiments are directed towards a method, in a user equipment, for a combined SRVCC and a PS HO from a LTE to a CDMA based communication system. The user equipment is comprised in the LTE based communication system. The method comprises receiving, from a base station, a combined SRVCC and PS HO request. The method further comprises sending, to the base station, a request for SRVCC. The method also comprises sending, to the base station, a request for PS HO.

Some of the example embodiments are directed towards a user equipment for a combined SRVCC and a PS HO from a LTE to a CDMA based communication system. The user equipment is comprised in the LTE based communication system. The user equipment comprises radio circuitry configured to receive, from a base station, a combined SRVCC and PS HO request. The radio circuitry is further configured to send, to the base station, a request for SRVCC. The radio circuitry is also configured to send, to the base station, a request for PS HO.

Some of the example embodiments are directed towards a method, in a MME, for a combined SRVCC and a PS HO from a LTE to a CDMA based communication system. The user equipment is comprised in the LTE based communication system. The method comprises receiving a notification message, where the notification message indicates that a combined SRVCC and PS HO has occurred and associated bearers are to be maintained. The associated bearers to be maintained are connected between the MME and a Packet Data Network Gateway.

Some of the example embodiments are directed towards a MME for a combined SRVCC and a PS HO from a LTE to a CDMA based communication system. The MME is comprised in the LTE based communication system. The MME comprises interface circuitry configured to receive a notification message, where the notification message indicates that a combined SRVCC and PS HO has occurred and associated bearers are to be maintained. The associated bearers are connected between the MME and a Packet Data Network Gateway.

DEFINITIONS

3GPP 3rd Generation Partnership Project
BS Base Station
BSC Base Station Controller
CDMA Code Division Multiple Access,
CS Circuit Switched
CSFB Circuit Switched Fallback
eCSFB enhanced CSFB
DL Downlink
eNB evolved NodeB
EPC Evolved Packet Core
E-UTRAN Evolved UTRAN
EV-DO Evolution Data Optimized
EV-DV Evolution Data Voice
GSM Global System for Mobile communications
HO Handover
HRPD High Rate Packet Data
HSGW HRPD SGW
HSS Home Subscriber Server
IMS IP Multimedia Subsystem
IMSI International Mobile Subscriber Identity
IWS Interworking Solution
LTE Long-Term Evolution
MME Mobility Management Entity
MSC Mobile Switching Center
NAS Non-Access Stratum
PCRF Policy and Charging Rules Function
PDN Packet Data Network
PGW PDN Gateway
PS Packet Switched
QoS Quality of Service
RAN Radio Access Node
RBS Radio Base Station
RTT Round Trip Time
SGW Serving Gateway
SRVCC Single Radio Voice Call Continuity
SV-DO Simultaneous Voice and Data
UE User Equipment
UL Uplink
UMTS Universal Mobile Telecommunications System
UTRAN Universal Terrestrial Radio Access Network
VPLMN Visited Public Land Mobile Network
WCDMA Wideband Code Division Multiple Access

BRIEF DESCRIPTION OF THE DRAWINGS

The foregoing will be described in more detail with the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments presented herein. However, the example embodiments may be practiced in other manners that depart from these specific details. In other instances, detailed descriptions of well-known methods and elements are omitted so as not to obscure the description of the example embodiments.

In order to better explain the example embodiments presented herein, a problem will first be identified and discussed. The mobility procedures between LTE and CDMA include optimized as well as non-optimized hand offs. The optimized solutions depend on signaling between EPC and CDMA Core to prepare for seamless handoff, while the non-optimized solutions depend on the user equipment re-selecting to a CDMA cell when needed.

Figure 1:
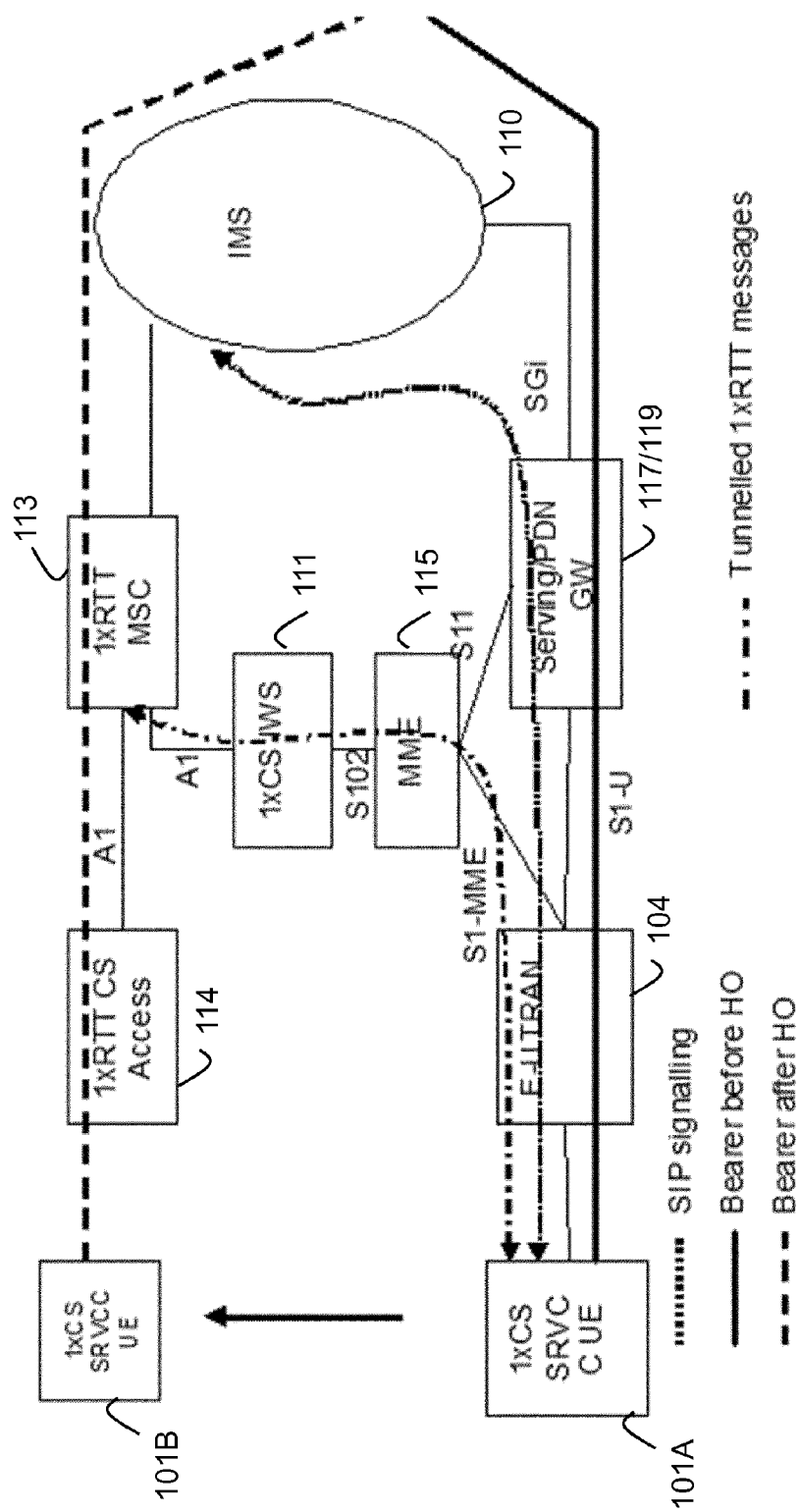
FIG. 1 is an illustrative example of network architecture used in a SRVCC procedure.

The optimized mobility solutions rely on specified interfaces between the systems, as shown in FIG. 1. FIG. 1 illustrates the network architecture involved in a SRVCC between LTE and CDMA based networks. A user equipment 101A may initially be attached to an LTE based network via a E-UTRAN 104 interface. The attached user equipment may be in communication with an Internet protocol Multimedia Subsystem (IMS) 110. The IMS may be utilized for delivering IP multimedia services to the user equipment. In the situation of a SRVCC, the multimedia service may be a voice call. The user equipment 101A may be in communication with the IMS through bearers established via the Serving Gateway (SGW) 117 and PDN gateway (PGW) 119.

During operation, the user equipment may move to a CDMA based system (e.g., user equipment 101B as shown in FIG. 1). Thus, a handover may occur with the use of a MME 115, a 1×CS IWS 111 and a 1×RTT MSC 113 such that the services with the IMS 110 are uninterrupted. The 1×RTT MSC is a Mobile Switching Center which is the primary service delivery node for GSM/CDMA based systems. The 1×RTT MSC is responsible for routing calls (e.g., voice calls) and for establishing and disconnecting the end to end connection for a user equipment. The S102 interface between the 3GPP MME the 1×CS IWS supports CSFB or SRVCC to 1×RTT. Paging, CSFB or SRVCC messages are tunneled over S102. It should be appreciated that during the SRVCC, the user experiences continuity in on-going voice calls. Thus, service is not disrupted.

Figure 2:
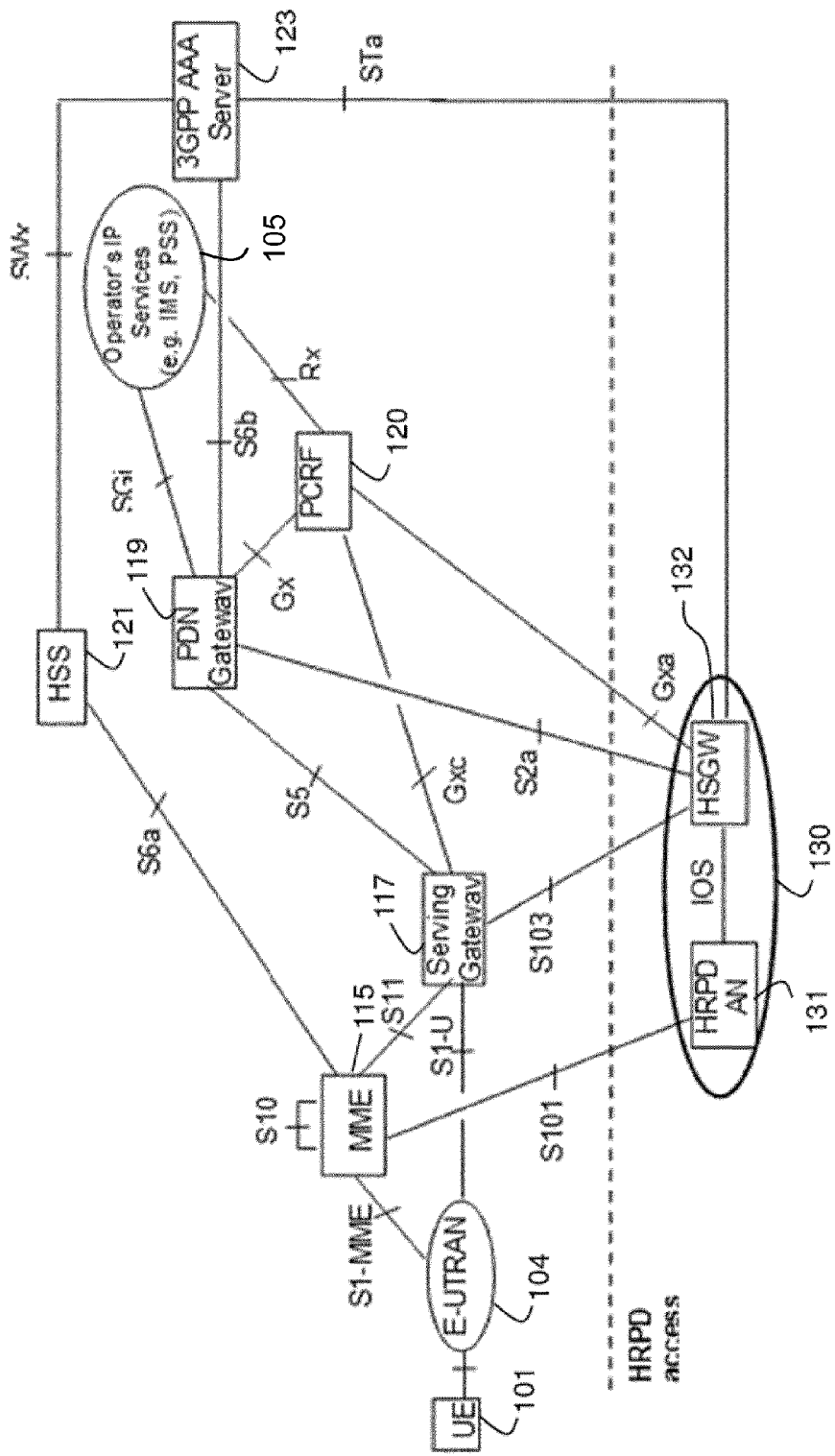
FIG. 2 is an illustrative example of network architecture used in a PS HO procedure.

FIG. 2 illustrates network architecture involved in a PS HO from LTE to HRPD. Initially, a user equipment 101 may be attached to an LTE based network though a E-UTRAN interface 104. The LTE based network may comprise a Mobility Management Entity (MME) 115, which may be responsible for idle mode user equipment tracking, paging procedures, and attachment and activation processes. The LTE system may also comprise a Serving Gateway (SGW) 117, which may be responsible for the routing and forwarding for data packets. The LTE system may also include a Packet data network Gateway (PGW) 119, which may be responsible for providing connectivity from the user equipment 101 to the operator of IP services 105. The MME 115 may be in communication with a Home Subscriber Server (HSS) 121, which may provide device identification information. It should be appreciated that the LTE system may also comprise a 3GPP AAA server 123 which may provide authentication, authorization and accounting support. The LTE system may also comprise a Policy and Charging Rules Function (PCRF) 120 which is the software node designated in real-time to determine policy rules in a multimedia network.

During operation, the user equipment 101 may move to a CDMA based system. If the user equipment is currently undergoing a packet based service, a PS HO is needed. During the PS HO, the user equipment may interface with a CDMA radio access point 130 comprising a HRPD AN 131 and a HSGW 132. The S101 interface between the 3GPP MME and the HRPD AN supports PS HO signaling from LTE to CDMA and S103 interface is a user data interface for data forwarding while doing PS HO.

The problem with the currently specified system, as illustrated in FIGS. 1 and 2, is that there are certain features missing. A user equipment that is engaged in an IMS voice call in LTE may be also connected via an internet APN or other APN(s) and may be utilizing some form of data application. The user equipment will then receive data on a separate PDN connection(s) and separate bearers for voice and data. If the UE loses LTE coverage, the SRVCC to 1×RTT procedure may be triggered by the eNB. The user equipment will then perform a 1×RTT SRVCC, and will be handed off to a CDMA1× cell and continue the voice session over the CDMA1× system. However, according to the current specification the data part of the user equipment connection will be suspended and/or disconnected. This is handled by the MME which is triggered by the message from the eNB.

So when the IMS user loses LTE coverage there is only voice continuity but not data continuity. Indeed, if the user is engaged in some data application which requires a guaranteed bitrate QoS, such as data streaming or video, these bearers will be deactivated instead of suspended. These bearers will not be recovered in CDMA and the session will be lost. Other applications not requiring GBR bearers are suspended and may be resumed again in the CDMA based network, but potentially with considerable disturbance. Therefore, in short, the problem is that there is no simultaneous 1×RTT SRVCC and PS HO to HRPD defined between LTE and CDMA systems.

Thus, in order to overcome the above discussed problems, some of the example embodiments presented herein define a new procedure for simultaneous 1×RTT SRVCC and PS HO to HRPD between LTE and CDMA systems. This procedure comprises mainly two parts. First, a decision is made in the eNB and communicated to the user equipment to perform the simultaneous 1×RTT SRVCC and PS HO to HRPD to CDMA systems. Thus, signaling between the eNB and the user equipment is modified. Secondly, there a new behavior in the MME to support session continuity for PS sessions is provided. To support this function, an indication from the eNB to the MME over the S1 interface may be sent to indicate to the MME to not suspend or deactivate bearers in case of simultaneous 1×RTT SRVCC and PS HO to HRPD.

The mobility procedures already defined between LTE and CDMA are specified in TS 23.272, TS 23.216 and TS 23.402. According to some of the example embodiments, the interfaces and the messages to support these procedures are already at hand and can be reused but are to be amended. According to some of the example embodiments, a new procedure for a combined SRVCC and PS HO may be provided. The combined procedure may comprise eNB triggering of SRVCC with PSHO with a user equipment. The SRVCC and PS HO may be requested simultaneously but be performed independently.

Figure 3:
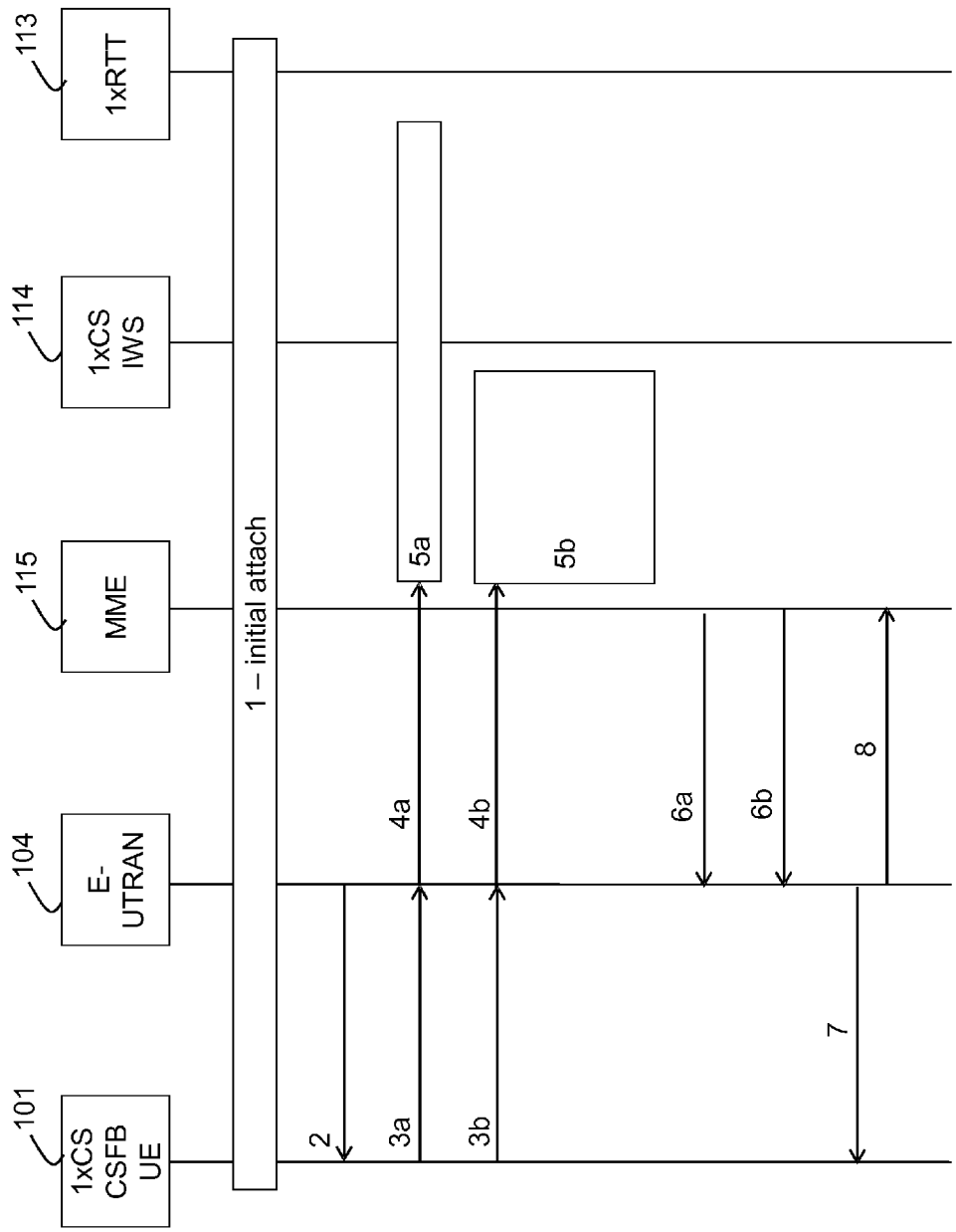
FIG. 3 is a messaging diagram depicting a combined SRVCC and PS HO procedure, according to some of the example embodiments.

FIG. 3 illustrates a messaging diagram incorporating some of the example embodiments presented herein. First, a user equipment may attach to a LTE based network via a E-UTRAN radio interface and thereafter start voice and packet data sessions (step 1). Thereafter, the eNB, or base station, may send a combined SRVCC and PS HO request to the user equipment (step 2). It should be appreciated that the eNB may have prior knowledge that the user equipment is capable to undergo the combined SRVCC and PS HO procedures. This prior knowledge may be provided by the user equipment via a user equipment capability indication. The user equipment capability indication may be in the form of an information element, a flag, or any other form of indication known in the art. The user equipment capability indication may be provided by the user equipment to the eNB during the attach procedure either directly or from the MME via NAS signaling.

Upon receiving the combined request, the user equipment may send requests to the eNB for a SRVCC and PS HO procedure (steps 3a and 3b). According to some of the example embodiments, the user equipment may send separate requests for the SRVCC and the PS HO. Once the eNB has received the requests from the user equipment, the eNB may forward each request to the MME via UL S1 CDMA2000 tunneling messages (steps 4a and 4b).

It should be appreciated that even though the eNB receives the request messages separately, the eNB may recognize that the requests are associated with a combined SRVCC and PS HO procedure. The eNB may recognize the combined SRVCC and PS HO procedure, for example, via an indication provided by the user equipment in the request messages of steps 3a and 3b. According to some of the example embodiments, the eNB may know that request messages coming from a particular user equipment will be intended for a combined SRVCC and PS HO procedure. According to some of the example embodiments, the eNB may now recognize that the received request messages of steps 3a and 3b may be intended for a combined SRVCC and PS HO procedure based on a time frame defined by the sending of the initial request of step 2 and the receipt of the requests from the user equipment. It should be appreciated that any other method of recognition may be utilized. It should further be appreciated that the MME may use similar forms of recognition to appreciate that the received requests (e.g., via steps 4a and 4b) are for a combined SRVCC and PS HO procedure.

Upon receiving the requests for the combined SRVCC and PS HO procedure, the MME may thereafter initiate a S102 direct transfer and 1×MSC interworking for establishing the SRVCC portion of the combined procedure (step 5a). The MME may also simultaneously initiate a S101 direct transfer with a HRPD access node for establishing the PS HO portion of the combined procedure (step 5b). After having received the results via Direct Transfer Request messages over S101 and S102, the MME will report the results of each procedure via DL S1 CDMA2000 tunneling messages (steps 6a and 6b).

Based on the information provided in the result messages of steps 6a and 6b, or if one or none of the messages are received within a predetermined period of time, the eNB will manage the combined SRVCC and PS HO procedure. For example, if the SRVCC related message (of step 6a) and the PS HO related message (of step 6b) indicate that the SRVCC and PS HO, respectively, were successful, the eNB may thereafter send a command message to the user equipment to move to the CDMA based network via the combined SRVCC and PS HO (step 7). The command message may comprise an information element to indicate to the user equipment that a combined SRVCC and PS HO should be performed. The eNB may thereafter be configured to send a S1-MME release message to the MME (step 8). The message may provide an indication that the MME shall not deactivate and/or suspend bearers associated with the combined SRVCC and PS HO. The bearers in question are bearers connected between the MME and PGW.

According to some of the example embodiments, if the SRVCC related message (of step 6a) indicates that the SRVCC portion of the procedure was successful and the PS HO related message (of step 6b) indicates that the PS HO portion of the procedure was unsuccessful, or if such a message was not received in a predetermined period of time, the eNB may send a message to the user equipment indicating that the user equipment shall move to the CDMA based network but that the combined SRVCC and PS HO procedure will be terminated and to proceed only with the SRVCC (step 7). In such a case, packet data service may be initiated once the user equipment is in the CDMA network. The eNB will also send a S1-MME release message to the MME (step 8). The S1-MME release message in this scenario may comprise an indication that the MME shall deactivate and/or suspend bearers associated with the combined SRVCC and PS HO. The associated bearers are those which are connected between the MME and the PGW. According to these example embodiments, only the SRVCC portion of the procedure will be completed. Thus, the user equipment will experience an interruption in the packet switched service. Packet switched service may be reinstated once the SRVCC has completed.

According to some of the example embodiments, if both the SRVCC and PS HO related messages (of steps 6a and 6b) indicate that the SRVCC and PS HO portions of the procedure was unsuccessful, or if neither of these messages were received in a predetermined period of time, the eNB may terminate both the SRVCC and PS HO procedures. It should be appreciated that the different indications provided in steps 7 and 8 may be provided via a cause code, flag, information element, or by any other means known in the art.

Figure 4:
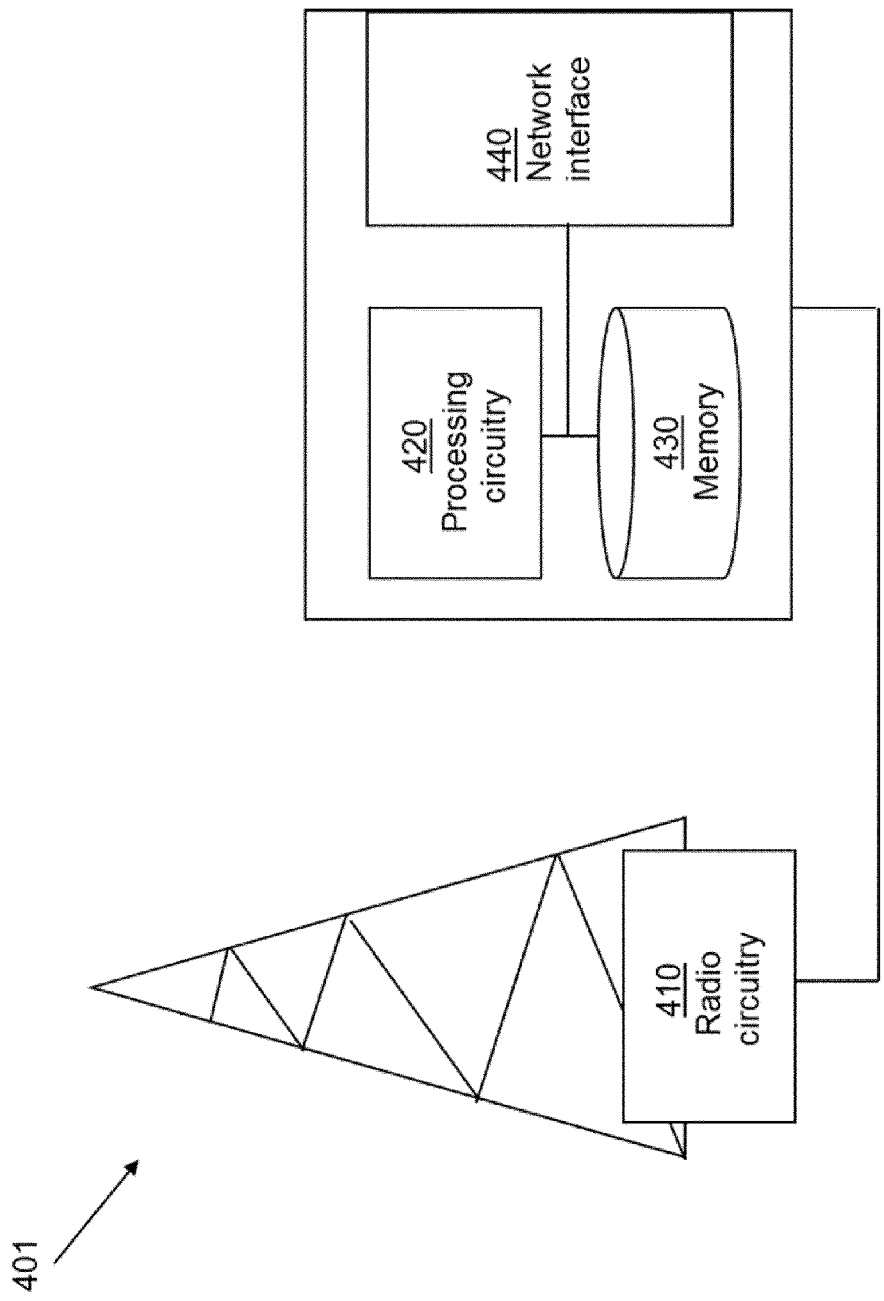
FIG. 4 is an example node configuration of a base station, according to some of the example embodiments.

FIG. 4 illustrates an example node configuration of a base station 401 which may perform some of the example embodiments described herein. The base station 401 may be comprised in the E-UTRAN interface. The base station 401 may comprise radio circuitry or a communication port 410 that may be configured to receive and/or transmit communication data, instructions, and/or messages. It should be appreciated that the radio circuitry or communication port 410 may be comprised as any number of transceiving, receiving, and/or transmitting units or circuitry. It should further be appreciated that the radio circuitry or communication port 410 may be in the form of any input or output communications port known in the art. The radio circuitry or communication 410 may comprise RF circuitry and baseband processing circuitry (not shown).

The base station 401 may also comprise a processing unit or circuitry 420 which may be configured to provide handling for a combined SRVCC and PS HO procedure. The processing circuitry 420 may be any suitable type of computation unit, for example, a microprocessor, digital signal processor (DSP), field programmable gate array (FPGA), or application specific integrated circuit (ASIC), or any other form of circuitry. The base station 401 may further comprise a memory unit or circuitry 430 which may be any suitable type of computer readable memory and may be of volatile and/or non-volatile type. The memory 430 may be configured to store received, transmitted, and/or measured data, device parameters, communication priorities, and/or executable program instructions.

Figure 5:
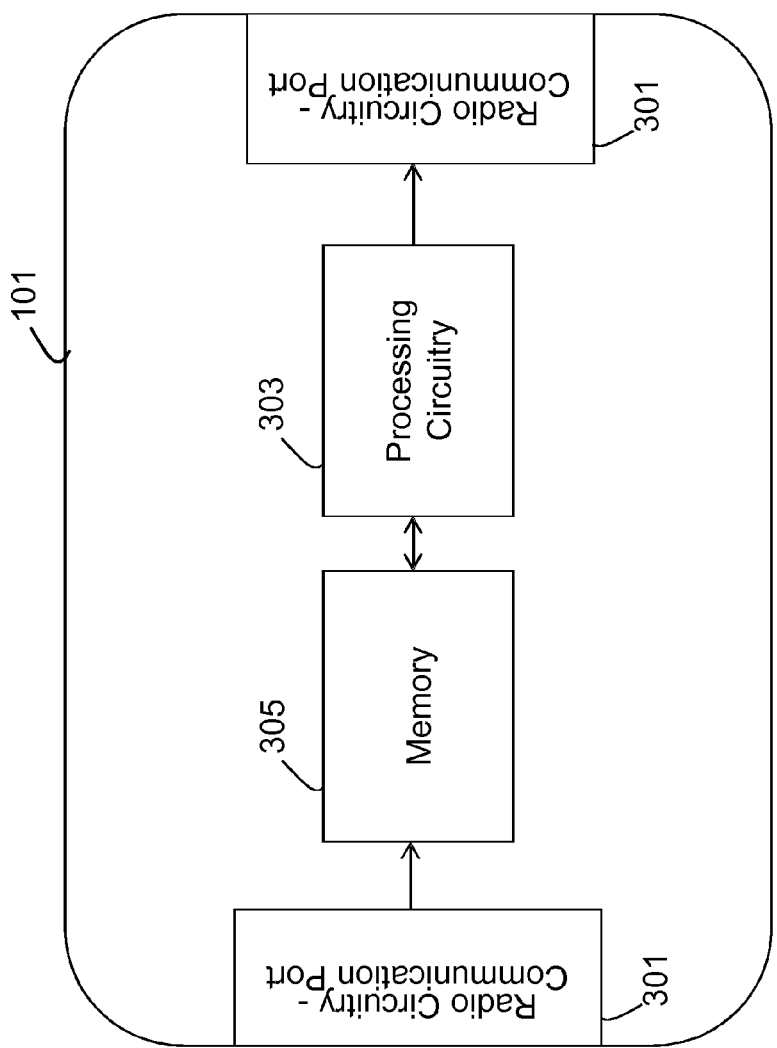
FIG. 5 is an example node configuration of a user equipment, according to some of the example embodiments.

FIG. 5 illustrates an example node configuration of a user equipment 101 which may perform some of the example embodiments described herein. The user equipment 101 may comprise radio circuitry or a communication port 301 that may be configured to receive and/or transmit communication data, instructions, and/or messages. It should be appreciated that the radio circuitry or communication port 301 may be comprised as any number of transceiving, receiving, and/or transmitting units or circuitry. It should further be appreciated that the radio circuitry or communication port 301 may be in the form of any input or output communications port known in the art. The radio circuitry or communication 301 may comprise RF circuitry and baseband processing circuitry (not shown).

The user equipment 101 may also comprise a processing unit or circuitry 303 which may be configured to provide handling for a combined SRVCC and PS HO procedure. The processing circuitry 303 may be any suitable type of computation unit, for example, a microprocessor, digital signal processor (DSP), field programmable gate array (FPGA), or application specific integrated circuit (ASIC), or any other form of circuitry. The user equipment 101 may further comprise a memory unit or circuitry 305 which may be any suitable type of computer readable memory and may be of volatile and/or non-volatile type. The memory 305 may be configured to store received, transmitted, and/or measured data, device parameters, communication priorities, and/or executable program instructions.

Figure 6:
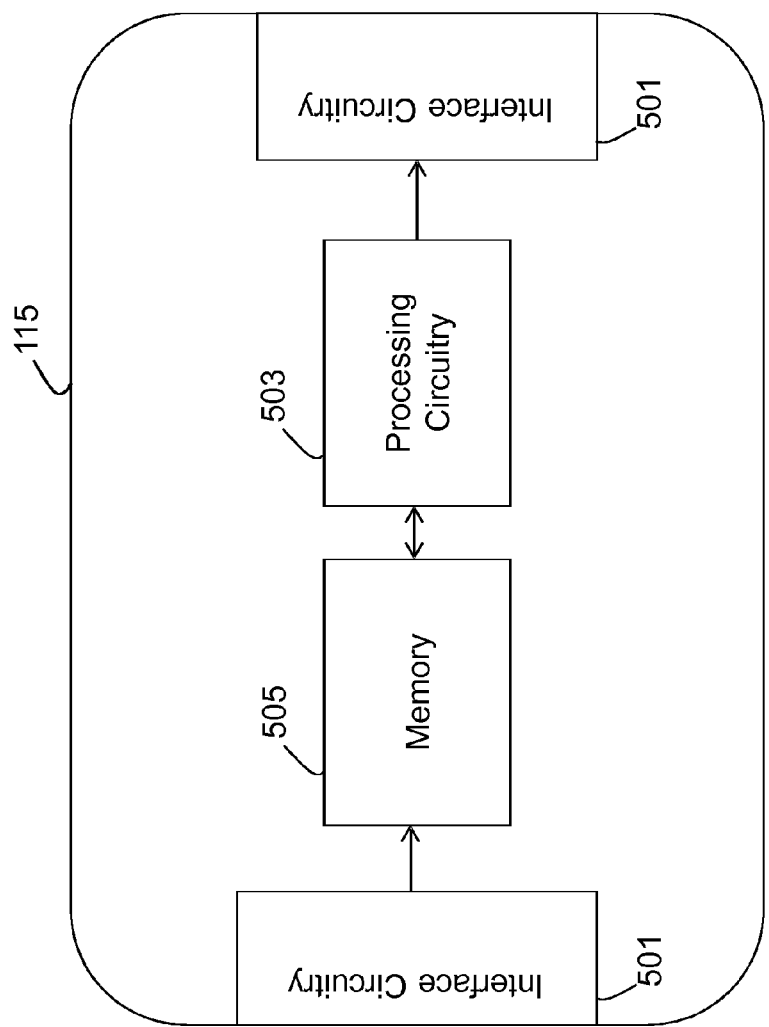
FIG. 6 is an example node configuration of a MME, according to some of the example embodiments.

FIG. 6 illustrates an example node configuration of a MME 115 which may perform some of the example embodiments described herein. The MME 115 may comprise interface circuitry or a communication port 501 that may be configured to receive and/or transmit communication data, instructions, and/or messages. It should be appreciated that the interface circuitry or communication port 501 may be comprised as any number of transceiving, receiving, and/or transmitting units or circuitry. It should further be appreciated that the interface circuitry or communication port 501 may be in the form of any input or output communications port known in the art. The interface circuitry or communication 501 may comprise RF circuitry and baseband processing circuitry (not shown).

The MME 115 may also comprise a processing unit or circuitry 503 which may be configured to provide handling for a combined SRVCC and PS HO procedure. The processing circuitry 503 may be any suitable type of computation unit, for example, a microprocessor, digital signal processor (DSP), field programmable gate array (FPGA), or application specific integrated circuit (ASIC), or any other form of circuitry. The MME 115 may further comprise a memory unit or circuitry 505 which may be any suitable type of computer readable memory and may be of volatile and/or non-volatile type. The memory 505 may be configured to store received, transmitted, and/or measured data, device parameters, communication priorities, and/or executable program instructions.

Figure 7:
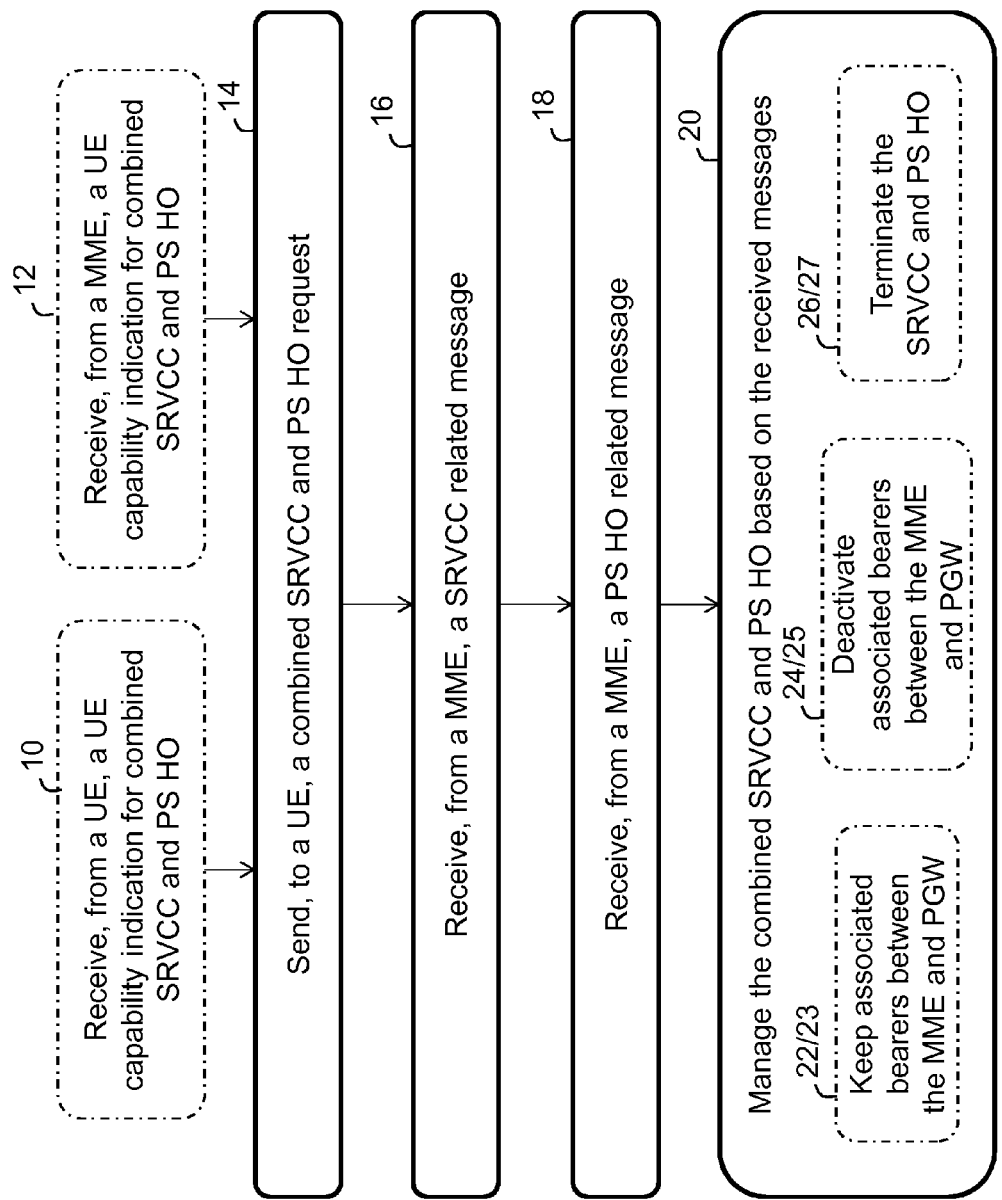
FIG. 7 is a flow diagram depicting example operations of the base station of FIG. 4, according to some of the example embodiments.

FIG. 7 is a flow diagram depicting example operations which may be taken by the base station 401 of FIG. 4 for handling for a combined SRVCC and PS HO procedure. It should also be appreciated that FIG. 7 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The example operations will be explained using the example network elements provided in FIGS. 1-6.

Example Operation 10

According to some of the example embodiments, the base station 401 may be configured to receive 10, from the user equipment 101, a user equipment capability indication for a combined SRVCC and PS HO. The receiving circuitry 410 may be configured to receive, from the user equipment, the user equipment capability indication for the combined SRVCC and PS HO.

According to some of the example embodiments, the user equipment may provide the capability indication during an initial attach procedure, registration procedure, a TAU, etc. It should be appreciated that the indication may be provided in any pre-existing message or in a new message. According to some of the example embodiments, the user equipment capability indication may be provided in the form of a flag, cause code, information element, or any other form of indication known in the art.

Example Operation 12

According to some of the example embodiments, the base station 401 may be configured to receive 12, from the MME 115, a user equipment capability indication for the combined SRVCC and PS HO procedure. The receiving circuitry 410 may be configured to receive, from the MME, the user equipment capability indication for the combined SRVCC and PS HO.

According to some of the example embodiments, the user equipment may provide the capability indication to the MME via NAS signaling. The user equipment may provide the capability indication to the MME during an initial attach procedure, registration procedure, a TAU, etc. The MME may provide the indication to the base station at some point, for example, during the attach procedure. It should be appreciated that the indication may be provided in any pre-existing message or in a new message. According to some of the example embodiments, the user equipment capability indication may be provided in the form of a flag, cause code, information element, or any other form of indication known in the art.

Operation 14

The base station 401 is configured to send 14, to the user equipment 101, a combined SRVCC and PS HO request. The radio circuitry 410 and/or processing circuitry 420 is be configured to send, to the user equipment, the combined SRVCC and PS HO request. An example of such a request is shown in at least step 1 of FIG. 3. According to some of the example embodiments, the sending 14 may be performed based on, for example, a load situation or measurement reports from the user equipment (e.g., indicating bad coverage). Thereafter, the base station may decide to initiate a combined SRVCC and PS HO procedure for a user equipment engaged in a voice call.

Operation 16

The base station 401 is further configured to receive 16, from the MME 115, a SRVCC related message indicating a result of the SRVCC portion of the combined SRVCC and PS HO request. The radio circuitry 410 and/or the processing circuitry 420 is configured to receive, from the MME 115, the SRVCC related message indicating the result of the SRVCC portion of the combined SRVCC and PS HO request. An example of such a message is shown in at least step 6a of FIG. 3.

Operation 18

The base station 401 is also configured to receive, from the MME 115, a PS HO related message indicating a result of the PS HO portion of the combined SRVCC and PS HO request. The radio circuitry 410 and/or the processing circuitry 420 is configured to receive, from the MME 115, the PS HO related message indicating the result of the PS HO portion of the combined SRVCC and PS HO request. An example of such a message is shown in at least step 6b of FIG. 3.

Operation 20

The base station 401 is further configured to manage 20 the combined SRVCC and PS HO based on the SRVCC related message and the PS HO related message, or based on the non-receipt of such messages within a predetermined period of time. The processing circuitry 420 is configured to manage the combined SRVCC and PS HO based on the SRVCC related message and the PS HO related message.

Example Operation 22

According to some of the example embodiments, the SRVCC related message may indicate that the SRVCC portion was success and the PS HO related message may indicate that the PS HO portion was successful. In such example embodiments, the managing 20 may further comprise sending 22, to the MME 115, a S1-MME release message indicating that the MME 115 shall not deactivate and/or suspend bearers associated with the combined SRVCC and PS HO. The bearers in question are connected between the MME and PGW, via the SGW. The processing circuitry 420 may be configured to send, to the MME 115, the S1-MME release message indicating that the MME 115 shall not deactivate and/or suspend bearers associated with the combined SRVCC and PS HO. An example of such a message is provided in FIG. 3 as step 8.

Example Operation 23

According to the example embodiments where the SRVCC related message may indicate that the SRVCC portion was success and the PS HO related message may indicate that the PS HO portion was successful, the base station 401 may also be configured to send 23, to the user equipment, a combined SRVCC and PS HO command. The processing circuitry 420 may be configured to send, to the user equipment, the combined SRVCC and PS HO command. An example of such a message is provided in FIG. 3 as step 7.

Example Operation 24

According to some of the example embodiments, the SRVCC related message may indicate that the SRVCC portion was successful and the PS HO related message may indicate that the PS HO portion was unsuccessful, or the PS HO related message is not received within a predetermined period of time or time-frame. In such example embodiments, the managing 20 may further comprising sending 24, to the MME 115, a S1-MME release message indicating that the MME shall deactivate and/or suspend bearers associated with the combined SRVCC and PS HO. The bearers in questions are connected between the MME and PGW, via the SGW. The processing circuitry 420 may be configured to send, to the MME 115, the S1-MME release message indicating that the MME shall deactivate and/or suspend bearers associated with the combined SRVCC and PS HO. An example of such a message is provided in FIG. 3 as step 8.

Example Operation 25

According to the example embodiments where the SRVCC related message may indicate that the SRVCC portion was successful and the PS HO related message may indicate that the PS HO portion was unsuccessful, or the PS HO related message is not received within a predetermined period of time or time-frame, the base station 401 may be further configured to send 25, to the user equipment, a SRVCC command. The SRVCC command may comprise an indication that the PS HO portion of the combined SRVCC and PS HO is terminated. The processing circuitry 420 may be configured to send, to the user equipment, the SRVCC command. An example of such a message is provided in FIG. 3 as step 7.

Example Operation 26

According to some of the example embodiments, the SRVCC related message may indicate that the SRVCC portion was unsuccessful or the message was not received within a predetermined period of time or time-frame. In such example embodiments, the managing 20 may further comprise terminating 26 the combined SRVCC and PS HO procedure. The processing circuitry 420 may be configured to terminate the combined SRVCC and PS HO procedure.

Figure 8:
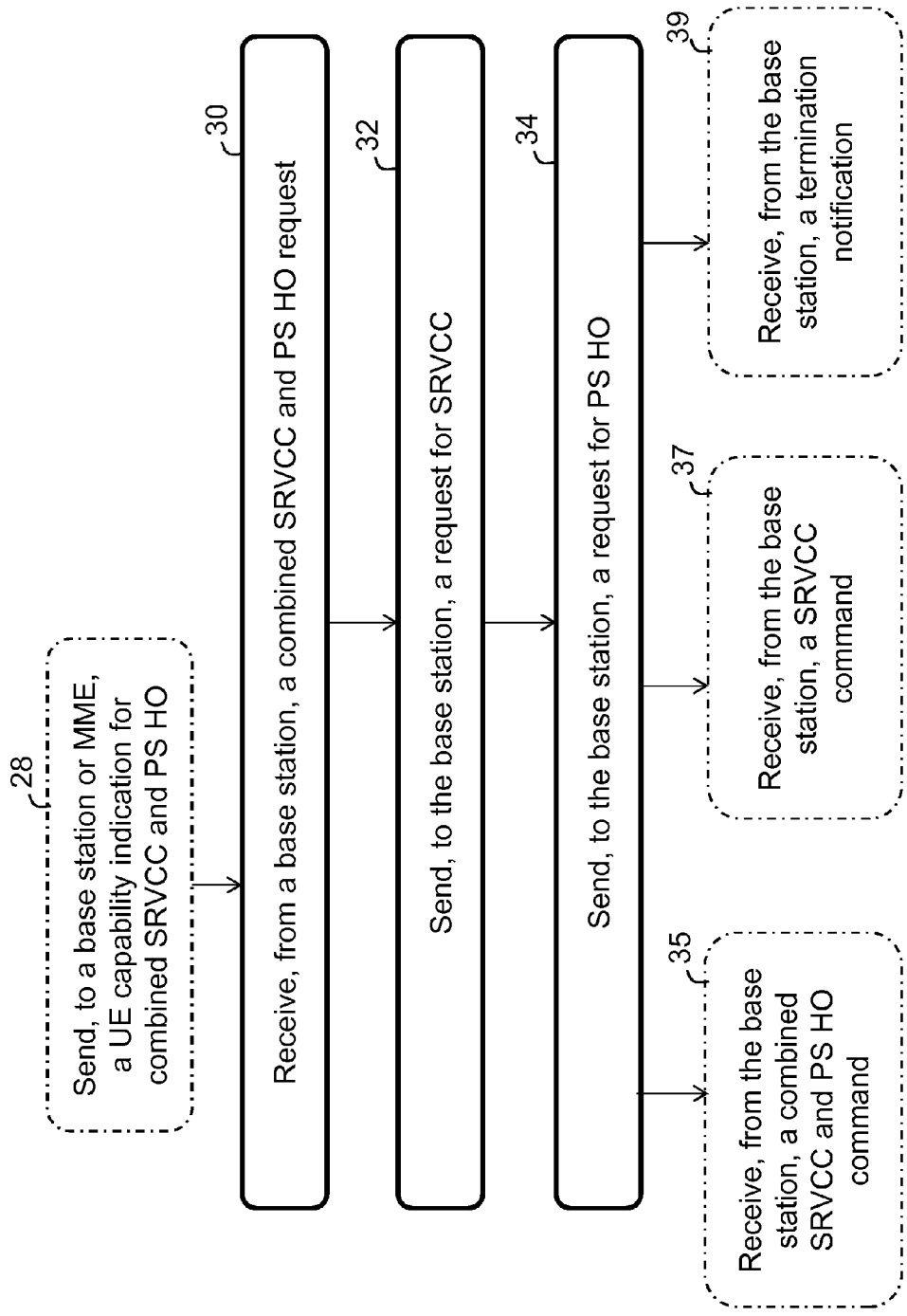
FIG. 8 is a flow diagram depicting example operations of the user equipment of FIG. 5, according to some of the example embodiments.

FIG. 8 is a flow diagram depicting example operations which may be taken by the user equipment 101 of FIG. 5 for handling for a combined SRVCC and PS HO procedure. It should also be appreciated that FIG. 8 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The example operations will be explained using the example network elements provided in FIGS. 1-6.

Example Operation 28

According to some of the example embodiments, the user equipment 101 may be configured to send, to a base station 401 or a MME 115, a user equipment capability indication for combined SRVCC and PS HO. The radio circuitry 301 may be configured to send to the base station 401 or MME 115, the user equipment capability indication for the combined SRVCC and PS HO.

According to some of the example embodiments, the user equipment may provide the capability indication during an initial attach procedure, registration procedure, a TAU, etc. It should be appreciated that the indication may be provided in any pre-existing message or in a new message. According to some of the example embodiments, the user equipment capability indication may be provided in the form of a flag, cause code, information element, or any other form of indication known in the art.

According to some of the example embodiments, the user equipment provides the capability indication to the base station 401, as described in example operation 10. According to some of the example embodiments, the user equipment may provide the capability indication to the MME via NAS signaling, as described in example operation 12. The MME may provide the indication to the base station at some point, for example, during the attach procedure. It should be appreciated that the indication may be provided in any pre-existing message or in a new message. According to some of the example embodiments, the user equipment capability indication may be provided in the form of a flag, cause code, information element, or any other form of indication known in the art.

Operation 30

The user equipment 101 is configured to receive 30, from the base station 401, a combined SRVCC and PS HO request. The radio circuitry 301 is configured to receive, from the base station 401, the combined SRVCC and PS HO request. Such a request is described in step 1 of FIG. 3 and operation 14.

Operation 32

The user equipment 101 is further configured to send 32, to the base station 401, a request for SRVCC. The radio circuitry 301 and/or the processing circuitry 303 is configured to send, to the base station 401, the request for SRVCC. Such a request is described in step 3a of FIG. 3.

Operation 34

The user equipment 101 is also configured to send 34, to the base station 401, a request for PS HO. The radio circuitry 301 and/or the processing circuitry 303 is configured to send, to the base station 401, the request for the PS HO. Such a request is described in step 3b of FIG. 3.

Example Operation 35

According to some of the example embodiments, the user equipment may be further configured to receive 35, from the base station, a combined SRVCC and PS HO command. The radio circuitry 301 may be configured to receive, from the base station, the combined SRVCC and PS HO command. Such a command is described in step 7 of FIG. 3.

Example Operation 37

According to some of the example embodiments, the user equipment may be further configured to receive 37, from the base station, a SRVCC command. The SRVCC command may comprise an indication that a PS HO portion of the combined SRVCC and PS HO is terminated. The radio circuitry 301 may be configured to receive, from the base station, the SRVCC command. Such a command is described in step 7 of FIG. 3.

Example Operation 39

According to some of the example embodiments, the user equipment may be further configured to receive 39, from the base station, a termination notification. The termination notification may comprise an indication that the combined SRVCC and PS HO is terminated. The radio circuitry 301 may be configured to receive, from the base station, the SRVCC command. Such a command is described in step 7 of FIG. 3.

Figure 9:
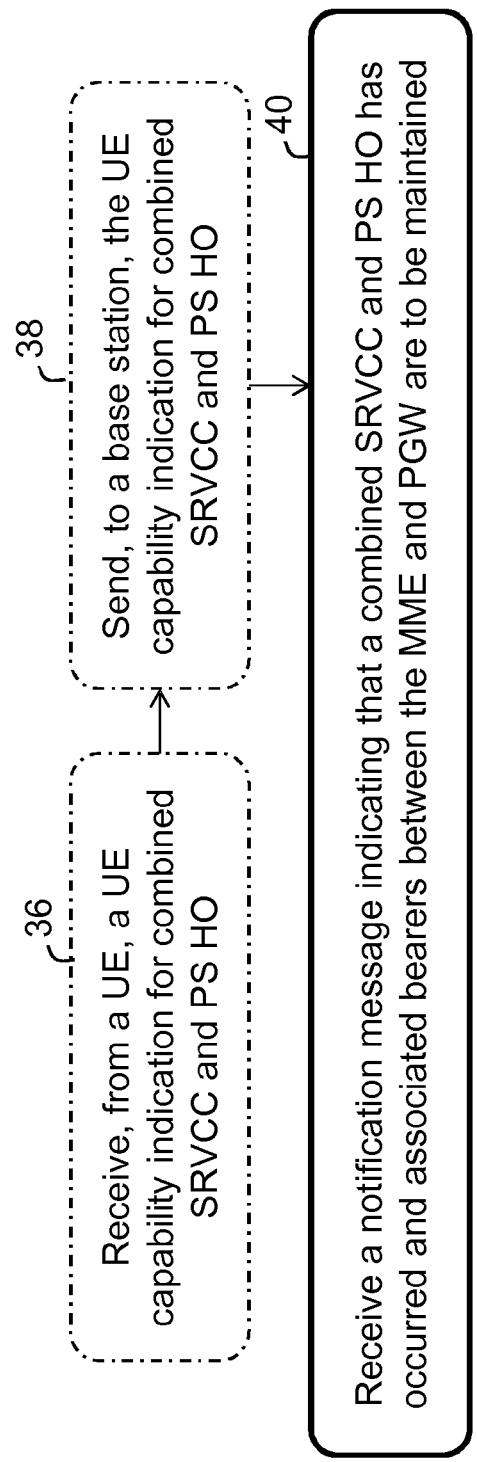
FIG. 9 is a flow diagram depicting example operations of the MME of FIG. 6, according to some of the example embodiments.

FIG. 9 is a flow diagram depicting example operations which may be taken by the MME 115 of FIG. 6 for handling for a combined SRVCC and PS HO procedure. It should also be appreciated that FIG. 9 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the boarder example embodiments. It should be appreciated that these operations need not be performed in order. Furthermore, it should be appreciated that not all of the operations need to be performed. The example operations may be performed in any order and in any combination. The example operations will be explained using the example network elements provided in FIGS. 1-6.

Example Operation 36

According to some of the example embodiments, the MME 115 may be configured to receive 36, from a user equipment 101, a user equipment capability indication for combined SRVCC and PS HO procedures. The interface circuitry 501 may be configured to receive, from the user equipment 101, the user equipment capability indication for the combined SRVCC and PS HO procedures.

According to some of the example embodiments, the user equipment may provide the capability indication to the MME via NAS signaling. The user equipment may provide the capability indication to the MME during an initial attach procedure, registration procedure, a TAU, etc. The MME may provide the indication to the base station at some point, for example, during the attach procedure. It should be appreciated that the indication may be provided in any pre-existing message or in a new message. According to some of the example embodiments, the user equipment capability indication may be provided in the form of a flag, cause code, information element, or any other form of indication known in the art. Example operation 36 is further described in relation to example operation 28. According to some of the example embodiments, the capability indication may be provided during an initial attach procedure.

Example Operation 38

According to some of the example embodiments, upon receiving the user equipment capability indication, the MME 115 may be further configured to send 38, to the base station 401, the user equipment capability indication for the combined SRVCC and PS HO. The interface circuitry 501 may be configured to send, to the base station 401, the user equipment capability indication. Example operation 38 is further described in relation to example operation 12.

Operation 40

The MME 115 is configured to receive 40 a notification message. The notification message indicates that a combined SRVCC and PS HO has occurred and associated bearers are to be maintained. The associated bearers are connected between the MME and the PGW via the SGW. The interface circuitry 501 is configured to receive the notification message.

According to some of the example embodiments, the notification message may be a S1-MME release message sent by the base station 401. Such a message is illustrated in step 8 of FIG. 3 and is further described in example operations 22, 24 and 26. It should also be appreciated that the message may be sent by the CDMA based network (e.g., a Notification Request HO Complete message).

Example embodiments directed towards a simultaneous 1×RTT SRVCC and PS HO to HRPD defined between LTE and CDMA systems have been provided herein. When the user engaged in data and IMS voice sessions loses LTE coverage and is handed off to a CDMA system, the example embodiments provide simultaneous voice continuity and data continuity. According to some of the example embodiments, the user equipment may be able to use 1× and HRPD in parallel. In CDMA systems, the HRPD is also known as EV-DO (Data only) and is an overlay system. The user equipment may also be configured to use 1× voice and HPRD data in parallel. Some of the example embodiments may be utilized for EV-DV (Data Voice).

It should be noted that although terminology from 3GPP LTE has been used herein to explain the example embodiments, this should not be seen as limiting the scope of the example embodiments to only the aforementioned system. Other wireless systems, comprising WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to comprise a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can comprise a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices.

The various example embodiments described herein are described in the general context of method steps or processes, which may be implemented in one aspect by a computer program product, embodied in a computer-readable medium, comprising computer-executable instructions, such as program code, executed by computers in networked environments. A computer-readable medium may comprise removable and non-removable storage devices comprising, but not limited to, Read Only Memory (ROM), Random Access Memory (RAM), compact discs (CDs), digital versatile discs (DVD), etc. Generally, program modules may comprise routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A method, in a base station, for a combined Single Radio Voice Call Continuity (SRVCC) and a Packed Switched Handover (PSHO) from a Long Term Evolution (LTE) based communication system to a Code Division Multiple Access (CDMA) based communication system, the base station being comprised in the LTE based communication system, the method comprising:
   the base station sending, to a user equipment (UE), a combined SRVCC and PS HO request, wherein the UE is engaged in both an LTE voice session and an LTE packet data session, and the combined SRVCC and PS HO request is configured to trigger a handover of both the LTE voice session and the LTE packet data session to the CDMA based communication system;
   receiving, from a Mobility Management Entity (MME) a SRVCC related message indicating a result of a SRVCC portion of the combined SRVCC and PS HO request;
   receiving, from the MME, a PS HO related message indicating a result of a PS HO portion of the combined SRVCC and PS HO request; and
   managing the combined SRVCC and PS HO based on the SRVCC related message and the PS HO related message.

2. The method of claim 1 further comprising receiving, from the user equipment, a user equipment capability indication for combined SRVCC and PS HO.

3. The method of claim 1, further comprising receiving, from the MME, a user equipment capability indication for combined SRVCC and PS HO.

4. The method of claim 1, wherein the SRVCC related message indicates that the SRVCC portion was successful and the PS HO related message indicates that the PS HO portion was successful, the managing further comprises:
   sending, to the MME, a S1-MME release message indicating that the MME shall not deactivate and/or suspend bearers associated with the combined SRVCC and PS HO, said bearers being connected between the MME and a Packet Data Network Gateway; and
   sending, to the user equipment, a combined SRVCC and PS HO command.

5. The method of claim 1, wherein the SRVCC related message indicates that the SRVCC portion was successful and the PS HO related message indicates that the PS HO portion was unsuccessful, or the PS HO related message is not received within a predetermined time-frame, the managing further comprises:
   sending, to the MME, a S1-MME release message indicating that the MME shall deactivate and/or suspend bearers associated with the combined SRVCC and PS HO, said bearers being connected between the MME and a Packet Data Network Gateway; and sending, to the user equipment, a SRVCC command, said SRVCC command providing an indication that the PS HO portion of the combined SRVCC and PS HO is terminated.

6. The method of claim 1, wherein the SRVCC related message indicates that the SRVCC portion was unsuccessful, or the SRVCC related message is not received within a predetermined time-frame, the managing further comprises terminating the combined SRVCC and PS HO.

7. The method of claim 1, further comprising, after sending the combined SRVCC and PS HO request message and before receiving from the MME the SRVCC related message and the PS HO related message:
  receiving an SRVCC request transmitted by the UE;
  receiving an PS HO request transmitted by the UE; and
  determining that that the SRVCC request and the PS HO request are associated with a combined SRVCC and PS HO procedure.

8. The method of claim 1, wherein determining that that the SRVCC request and the PS HO request are associated with the combined SRVCC and PS HO procedure comprises the base station determining that at least one of the SRVCC request and the PS HO request sent by the UE includes an indication that the request is associated with the combined SRVCC and PS HO procedure.

9. A base station for a combined Single Radio Voice Call Continuity (SRVCC) and a Packed Switched Handover (PSHO) from a Long Term Evolution (LTE) based communication system to a Code Division Multiple Access (CDMA) based communication system, the base station being comprised in the LTE based communication system, the base station comprising:
  processing circuitry configured to send, to a user equipment (UE), a combined SRVCC and PS HO request, wherein the UE is engaged in both an LTE voice session and an LTE packet data session, and the combined SRVCC and PS HO request is configured to trigger a handover of both the LTE voice session and the LTE packet data session to the CDMA based communication system;
  the processing circuitry configured to receive, from a Mobility Management Entity (MME) a SRVCC related message indicating a result of a SRVCC portion of the combined SRVCC and PS HO request;
  the processing circuitry further configured to receive, from the MME, a PS HO related message indicating a result of a PS HO portion of the combined SRVCC and PS HO request; and
  the processing circuitry configured to manage the combined SRVCC and PS HO based on the received SRVCC related message and the received PS HO related message.

10. The base station of claim 9, wherein the processing circuitry is further configured to receive, from the user equipment, a user equipment capability indication for combined SRVCC and PS HO.

11. The base station of claim 9, wherein the processing circuitry is further configured to receive, from the MME, a user equipment capability indication for combined SRVCC and PS HO.

12. The base station of claim 9, wherein the SRVCC related message indicates that the SRVCC portion was successful and the PS HO related message indicate that the PS HO portion was successful, the processing circuitry is further configured to send, to the MME, a S1-MME release message indicating that the MME shall not deactivate and/or suspend bearers associated with the combined SRVCC and PS HO, said bearers being connected between the MME and a Packet Data Network Gateway, the processing circuitry is further configured to send, to the user equipment, a combined SRVCC and PS HO command.

13. The base station of claim 9, wherein if the SRVCC related message indicates that the SRVCC portion was successful and the PS HO related message indicates that the PS HO portion was unsuccessful, or the PS HO related message is not received within a predetermined time-frame, the processing circuitry is further configured to send, to the MME, a S1-MME release message indicating that the MME shall deactivate and/or suspend bearers associated with the combined SRVCC and PS HO, said bearers being connected between the MME and a Packet Data Network Gateway, and the processing circuitry is further configured to send, to the user equipment, a SRVCC command, said SRVCC command providing an indication that the PS HO portion of the combined SRVCC and PS HO is terminated.

14. The base station of claim 9, wherein the SRVCC related message indicates that the SRVCC was unsuccessful or the SRVCC related message was not received in a predetermined time-frame, the processing circuitry is further configured to terminate the combined SRVCC and PS HO.

15. A method, in a user equipment (UE), for a combined Single Radio Voice Call Continuity (SRVCC) and a Packed Switched Handover (PSHO) from a Long Term Evolution (LTE) to a Code Division Multiple Access (CDMA) based communication system, the method comprising:
  the UE establishing an LTE voice session;
  the UE establishing an LTE packet data session;
  receiving, from a base station, a combined SRVCC and PS HO request, the combined SRVCC and PS HO request being configured to trigger a handover of both the LTE voice session and the LTE packet data session to the CDMA based communication system; and
  in response to receiving the combined SRVCC and PS HO request, the UE transmitting to the base station a request for SRVCC and a request for PS HO.

16. The method of claim 15, further comprising receiving, from the base station, a combined SRVCC and PS HO command.

17. The method of claim 15, further comprising receiving, from the base station, a SRVCC command, said SRVCC command comprising an indication that a PS HO portion of the combined SRVCC and PS HO is terminated.

18. The method of claim 15, further comprising receiving, from the base station, a termination notification, said termination notification comprising an indication that the combined SRVCC and PS HO is terminated.

19. The method of claim 15, further comprising sending, to the base station or a Mobility Management Entity (MME) a user equipment capability indication for combined SRVCC and PS HO.

20. A user equipment for a combined Single Radio Voice Call Continuity (SRVCC) and a Packed Switched Handover (PSHO) from a Long Term Evolution (LTE) to a Code Division Multiple Access (CDMA) based communication system, the user equipment comprising:
  a memory;
  radio circuitry; and
  processing circuitry coupled to the memory and the radio circuitry, wherein the processing circuitry is operable to:
  establish an LTE voice session
  establish an LTE packet data session; and obtain, via the radio circuitry, a combined SRVCC and PS HO request transmitted by a base station, the combined SRVCC and PS HO request being configured to trigger a handover of both the LTE voice session and the LTE packet data session to the CDMA based communication system, wherein the processing circuitry is configured such that, in response to obtaining the combined SRVCC and PS HO request, the processing circuitry employs the radio circuitry to transmit to the base station a request for SRVCC and a request for PS HO.

21. The user equipment of claim 20, wherein the radio circuitry is further configured to receive, from the base station, a combined SRVCC and PS HO command.

22. The user equipment of claim 20, wherein the radio circuitry is further configured to receive, from the base station, a SRVCC command, said SRVCC command comprising an indication that a PS HO portion of the combined SRVCC and PS HO is terminated.

23. The user equipment of claim 20, wherein the radio circuitry is further configured to receive, from the base station, a termination notification, said termination notification comprising an indication that the combined SRVCC and PS HO is terminated.

24. The user equipment of claim 20, wherein the radio circuitry is further configured to send, to the base station or a Mobility Management Entity (MME) a user equipment capability indication for combined SRVCC and PS HO.

25. A method in a Mobility Management Entity (MME) for a combined Single Radio Voice Call Continuity (SRVCC) and a Packed Switched Handover (PSHO) from a Long Term Evolution (LTE) to a Code Division Multiple Access (CDMA) based communication system, the method comprising:

determining that a base station has sent to a user equipment (UE) a combined SRVCC and PS HO request, wherein the UE is engaged in both an LTE voice session and an LTE packet data session, and the combined SRVCC and PS HO request is configured to trigger a handover of both the LTE voice session and the LTE packet data session to the CDMA based communication system; and receiving a notification message, said notification message indicating that the combined SRVCC and PS HO has occurred with respect to the UE and associated bearers are to be maintained, said bearers being connected between the MME and a Packet Data Network Gateway.

26. The method of claim 25, wherein the notification message is a S1-MME release command sent by a base station.

27. The method of claim 25, wherein the notification message is sent by a CDMA radio access node.

28. The method of claim 25, further comprising:

receiving, from a user equipment, a user equipment capability indication for combined SRVCC and PS HO procedures; and sending, to a base station, a user equipment capability indication for the combined SRVCC and PS HO.

29. The method of claim 25, wherein determining that the base station has sent to the UE the combined SRVCC and PS HO request comprises:

the MME receiving from an LTE base station a single message comprising a request for combined SRVCC and PS HO.

30. The method of claim 25, wherein determining that the base station has sent to the UE the combined SRVCC and PS HO request comprises:

the MME receiving from an LTE base a first request for SRVCC; and the MME receiving from the LTE base a second request for PS HO, wherein the first request comprises a combined SRVCC and PS HO indicator, and the second request comprises a combined SRVCC and PS HO indicator.

31. A Mobility Management Entity (MME) for a combined Single Radio Voice Call Continuity (SRVCC) and a Packed Switched Handover (PSHO) from a Long Term Evolution (LTE) to a Code Division Multiple Access (CDMA) based communication system, the MME being comprised in the LTE based communication system, the MME comprising:

processing circuitry for determining that a base station has sent to a user equipment (UE) a combined SRVCC and PS HO request, wherein the UE is engaged in both an LTE voice session and an LTE packet data session, and the combined SRVCC and PS HO request is configured to trigger a handover of both the LTE voice session and the LTE packet data session to the CDMA based communication system; and interface circuitry configured to receive a notification message, said notification message indicating that the combined SRVCC and PS HO has occurred and associated bearers are to be maintained, said bearers being connected between the MME and a Packet Data Network Gateway.

32. The MME of claim 31, wherein the notification message is a S1-MME release command sent by a base station.

33. The MME of claim 31, wherein the notification message is sent by a CDMA radio access node.

34. The MME of claim 31, wherein the interface circuitry is further configured to receive, from a user equipment, a user equipment capability indication for combined SRVCC and PS HO procedures; and the interface circuitry is further configured to send, to a base station, a user equipment capability indication for the combined SRVCC and PS HO.

* * * * *